(12) United States Patent
Koo et al.

(10) Patent No.: US 11,894,743 B2
(45) Date of Patent: Feb. 6, 2024

(54) COIL ASSEMBLY AND MOTOR INCLUDING THE SAME

(71) Applicant: HYUNDAI MOBIS CO., LTD., Seoul (KR)

(72) Inventors: Min Mo Koo, Yongin-si (KR); Yong Ho Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 112 days.

(21) Appl. No.: 17/459,209

(22) Filed: Aug. 27, 2021

(65) Prior Publication Data
US 2022/0069658 A1    Mar. 3, 2022

(30) Foreign Application Priority Data

Aug. 31, 2020    (KR) .................. 10-2020-0110279

(51) Int. Cl.
*H02K 3/48* (2006.01)
*H01F 5/00* (2006.01)

(52) U.S. Cl.
CPC ............... *H02K 3/48* (2013.01); *H01F 5/00* (2013.01)

(58) Field of Classification Search
CPC ... H01F 5/00; H02K 3/00; H02K 3/04; H02K 3/32; H02K 3/34; H02K 3/46; H02K 3/47; H02K 3/48
USPC ................ 310/12.21, 12.22, 201, 203, 208
See application file for complete search history.

(56) References Cited

U.S. PATENT DOCUMENTS

| | | | |
|---|---|---|---|
| 2013/0192057 A1* | 8/2013 | Koga | H02K 15/085 29/596 |
| 2013/0193798 A1* | 8/2013 | Koga | H02K 15/0031 310/208 |
| 2016/0043605 A1* | 2/2016 | Mizutani | H02K 3/12 310/45 |
| 2016/0056696 A1* | 2/2016 | Ito | H02K 3/12 29/596 |
| 2017/0025907 A1* | 1/2017 | Iki | H02K 3/50 |
| 2017/0141635 A1* | 5/2017 | Iki | H02K 3/32 |
| 2019/0027989 A1* | 1/2019 | Ishigami | H02K 3/345 |
| 2020/0212770 A1* | 7/2020 | Yoshikawa | B21D 22/02 |
| 2020/0220411 A1* | 7/2020 | Kim | H02K 3/50 |
| 2020/0366172 A1* | 11/2020 | Kuroyanagi | H02K 1/165 |
| 2021/0057971 A1* | 2/2021 | Takeda | H02K 15/024 |
| 2021/0167657 A1* | 6/2021 | Koga | H02K 3/34 |
| 2021/0234439 A1* | 7/2021 | Koga | H02K 15/0031 |
| 2021/0249926 A1* | 8/2021 | Enomoto | H02K 3/50 |
| 2021/0273514 A1* | 9/2021 | Koga | H02K 3/12 |
| 2022/0320932 A1* | 10/2022 | Sakaguchi | H02K 3/18 |
| 2023/0026729 A1* | 1/2023 | Lee | H02K 1/2786 |

* cited by examiner

*Primary Examiner* — Rashad H Johnson
(74) *Attorney, Agent, or Firm* — MORGAN, LEWIS & BOCKIUS LLP

(57) ABSTRACT

The present disclosure relates to a coil assembly including: a plurality of unit flat coils disposed and spaced apart from one another in a circumferential direction; and a molding body made by dual injection molding and configured to partially surround the unit flat coils, thereby simplifying a structure of the coil assembly and a process of manufacturing the coil assembly.

13 Claims, 11 Drawing Sheets

COIL ASSEMBLY AND MOTOR INCLUDING THE SAME

CROSS-REFERENCE TO RELATED APPLICATION

This application claims priority to and the benefit of Korean Patent Application No. 10-2020-0110279 filed in the Korean Intellectual Property Office on Aug. 31, 2020, the entire contents of which are incorporated herein by reference.

TECHNICAL FIELD

The present disclosure relates to a motor, and more particularly, to a coil assembly capable of having a simple structure and being manufactured by a simplified manufacturing process, and a motor including the same.

BACKGROUND

A hybrid vehicle or an electric vehicle, which is called an environmentally-friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around slots of the stator cores.

Recently, a method using a flat coil (also called an "edge-wise coil") as a stator coil has been proposed as a method of implementing a high output of the motor and reducing a size of the motor.

Unlike an annular coil in the related art having a circular cross-section, the flat coil has an angular cross-section (e.g., a quadrangular cross-section), which can advantageously minimize a dead space (dead zone) in a slot of the stator and maximize a space factor of the stator coil.

However, the stator using the flat coil in the related art needs to be manufactured by complicated processes including a process of straightening (linearizing) a coil (annular coil) covered with a coating film (e.g., an enamel coating film), a process of forming (e.g., pressing) the coil corresponding to a shape of the slot of the stator, a process of inserting the coil into the slot, a process of removing (e.g., laser-stripping) the coating film from ends of the coil, a process of cutting the coil, a process of connecting (twisting) the ends of the coil and then welding the ends of the coil, and a process of coating (e.g., epoxy coating) the connection portion of the coil. Further, a process of inserting an insulation sheet, which is manufactured separately from the coil, into the slot needs to be performed. For this reason, there is a problem in that a structure of the stator and a process of manufacturing the stator are complicated and efficiency in manufacturing the stator deteriorates.

Therefore, recently, various studies have been conducted to simplify the structure of the stator and the process of manufacturing the stator, but the study results are still insufficient. Accordingly, there is a need to develop a technology to simplify the structure of the stator and the process of manufacturing the stator.

SUMMARY

The present disclosure has been made in an effort to provide a coil assembly capable of having a simple structure and being manufactured by a simplified manufacturing process, and a motor including the same.

The present disclosure has also been made in an effort to integrate a flat coil and a molding body by dual injection molding.

The present disclosure has also been made in an effort to simplify an assembly process and improve an assembly property.

The present disclosure has also been made in an effort to freely form a flat coil without risk of damaging a coating film, exclude a process of removing the coating film, and exclude a process of manufacturing a separate insulation sheet.

The present disclosure has also been made in an effort to allow a heat treatment (annealing) process for ensuring extensibility of a flat coil.

The objects to be achieved by the embodiments are not limited to the above-mentioned objects, but also include objects or effects that may be understood from the solutions or embodiments described below.

An embodiment of the present disclosure provides a coil assembly including: a plurality of unit flat coils disposed and spaced apart from one another in a circumferential direction; and a molding body including a structure formed in dual injection molding and configured to partially surround the plurality of unit flat coils.

This is to simplify a structure of the coil assembly and a process of manufacturing the coil assembly.

That is, the stator using the flat coil in the related art needs to be manufactured by complicated processes including a process of straightening (linearizing) a coil (annular coil) covered with a coating film (e.g., an enamel coating film), a process of forming (e.g., pressing) the coil corresponding to a shape of the slot of the stator, a process of inserting the coil into the slot, a process of removing (e.g., laser-stripping) the coating film from ends of the coil, a process of cutting the coil, a process of connecting (twisting) the ends of the coil and then welding the ends of the coil, and a process of coating (e.g., epoxy coating) the connection portion of the coil. Further, a process of inserting an insulation sheet, which is manufactured separately from the coil, into the slot needs to be performed. For this reason, there is a problem in that a structure of the stator and a process of manufacturing the stator are complicated and efficiency in manufacturing the stator deteriorates.

However, according to the embodiment of the present disclosure, the molding body is manufactured by dual injection molding to partially surround the unit flat coils, and a separate insulation sheet for insulating the unit flat coils need not be inserted into the slot of the core. Therefore, it is possible to obtain an advantageous effect of simplifying the structure and the manufacturing process and improving the assembly property.

The unit flat coil in the embodiment of the present disclosure may be defined as a flat coil (or flat coil structure) that may be accommodated in the single slot.

In particular, the plurality of unit flat coils may have the same structure. Therefore, the plurality of unit flat coils may be manufactured using a single forming machine (forming condition) in common. Therefore, it is possible to obtain an advantageous effect of simplifying a manufacturing process and reducing manufacturing costs.

According to the exemplary embodiment of the present disclosure, each of the plurality of unit flat coils may include: a first flat coil having a first cross-sectional shape; and a second flat coil having a second cross-sectional shape different from the first cross-sectional shape and insulated from the first flat coil by the molding body.

In particular, each of the plurality of unit flat coils may be configured by a conductor that excludes a coating film from a surface thereof.

In the embodiment of the present disclosure, since the unit flat coil is configured by the conductor that is free of a coating film from the surface thereof as described above, it is possible to freely form the flat coil without risk of damaging the coating film (because there is no coating film), exclude a process of removing the coating film, and allow a heat treatment (annealing) process to ensure extensibility of the flat coil.

The molding body may be variously changed in structure in accordance with required conditions and design specifications.

For example, the molding body may include: a plurality of unit molding portions disposed on the respective unit flat coils and configured to partially surround the unit flat coils; and a connection portion configured to connect adjacent unit molding portions of the plurality of unit molding portions.

In particular, a first end and a second end of each of the plurality of unit flat coils in a longitudinal direction thereof may be exposed to an outside of the molding body.

More specifically, each of the plurality of unit molding portions may include: a first accommodation portion configured to accommodate the first flat coil; and a second accommodation portion spaced apart from the first accommodation portion and configured to accommodate the second flat coil.

According to the exemplary embodiment of the present disclosure, the connection portion may connect first ends of the adjacent unit molding portions to each other, and second ends of the adjacent unit molding portions may be disposed to be spaced apart from each other.

Since the plurality of unit molding portions is continuously connected by the connection portion as described above, the plurality of unit flat coils may be integrated with one another by the unit molding portion. Therefore, the plurality of unit flat coils may be simultaneously inserted into the corresponding slots without the inconvenience that may be caused at the time of individually inserting the plurality of unit flat coils into the corresponding slots one by one.

In addition, the connection portion may be supported on outer surfaces of teeth. Since the connection portion is supported on the outer surfaces of the teeth as described above, the connection portion may inhibit (serve as a stopper for inhibiting) the unit flat coil accommodated in the slot from being withdrawn, through one end opening of the slot, toward the other end opening of the slot. Therefore, it is possible to obtain an advantageous effect of stably maintaining a state in which the coil assembly is arranged with respect to the core.

Another embodiment of the present disclosure provides a motor including: a core including a plurality of teeth disposed on an inner circumferential surface thereof and spaced apart from one another with slots disposed between the teeth; and a coil assembly including: a plurality of unit flat coils respectively accommodated in the slots; and a molding body including a structure formed in dual injection molding and configured to partially surround the unit flat coils.

According to the exemplary embodiment of the present disclosure, each of the plurality of unit flat coils may include: a first flat coil having a first cross-sectional shape; and a second flat coil having a second cross-sectional shape different from the first cross-sectional shape and insulated from the first flat coil by the molding body.

According to the exemplary embodiment of the present disclosure, the molding body may include: a plurality of unit molding portions disposed on the respective unit flat coils and configured to partially surround the unit flat coils; and a connection portion configured to connect the adjacent unit molding portions.

According to the exemplary embodiment of the present disclosure, each of the plurality of unit molding portions may include: a first accommodation portion configured to accommodate the first flat coil; and a second accommodation portion spaced apart from the first accommodation portion and configured to accommodate the second flat coil.

According to the exemplary embodiment of the present disclosure, the connection portion may connect ends of the adjacent unit molding portions and be supported on the teeth.

According to the exemplary embodiment of the present disclosure, the first flat coil and the second flat coil may each be configured by a conductor that is free of a coating film from a surface thereof.

According to the exemplary embodiment of the present disclosure, a first end and a second end of each of the plurality of unit flat coils in a longitudinal direction thereof may be exposed to an outside of the molding body and the core.

DETAILED DESCRIPTION

Figure 1:
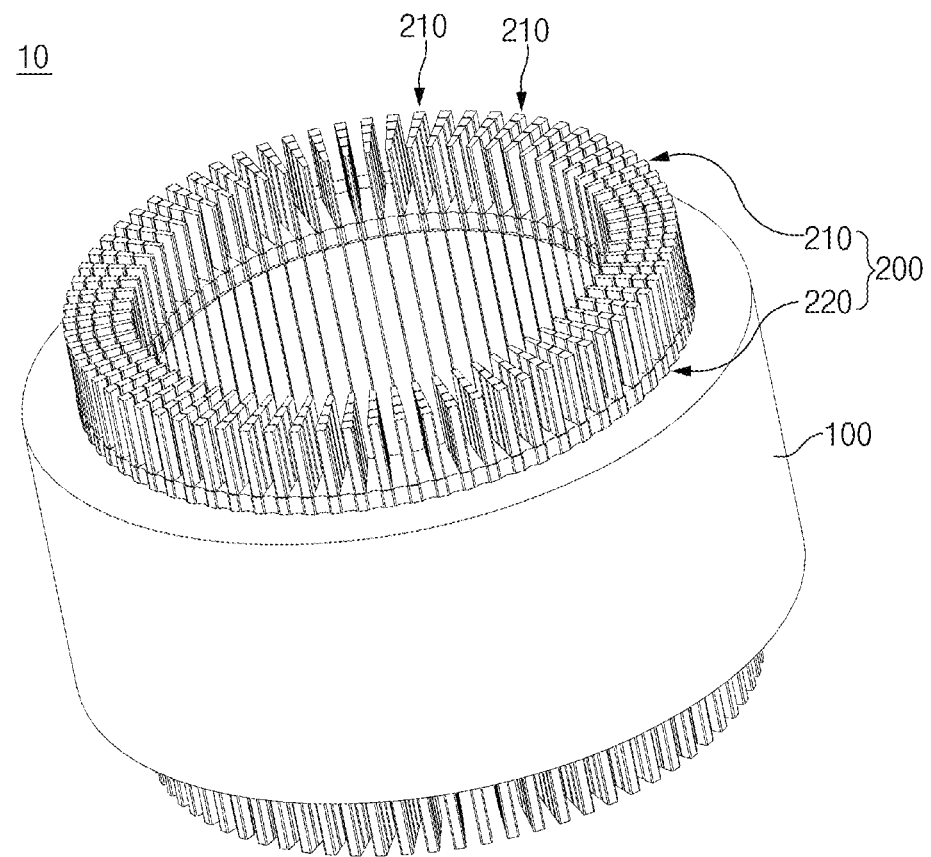
FIG. 1 is a perspective view for explaining a motor according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 11, a coil assembly 200 according to an embodiment of the present disclosure includes a plurality of unit flat coils 210 disposed and spaced apart from one another in a circumferential direction, and a molding body 220 formed by dual injection molding and configured to partially surround the unit flat coils 210.

For reference, the coil assembly 200 according to the embodiment of the present disclosure may be applied to various types of motors 10 in accordance with required conditions and design specifications. The present disclosure is not restricted or limited by the type and structure of the motor 10.

Further, the motor 10, to which the coil assembly 200 according to the embodiment of the present disclosure is applied, may be used as the drive motor 10 for a hybrid vehicle and/or an electric vehicle that obtains driving power from electrical energy in an environmentally friendly vehicle. The present disclosure is not restricted or limited by the type of subject to which the motor 10 is applied.

For example, the motor 10 according to the embodiment of the present disclosure may include a stator (not illustrated) disposed in a housing, and a rotor (not illustrated) rotatably installed in the stator with a predetermined air gap from the stator.

The housing has a predetermined receiving space therein, and the stator is accommodated in the housing. For example, the housing may be installed in the vehicle and seal the motor 10.

The housing may have various shapes and structures capable of accommodating the stator therein, and the present disclosure is not restricted or limited by the shape and structure of the housing.

Figure 2:
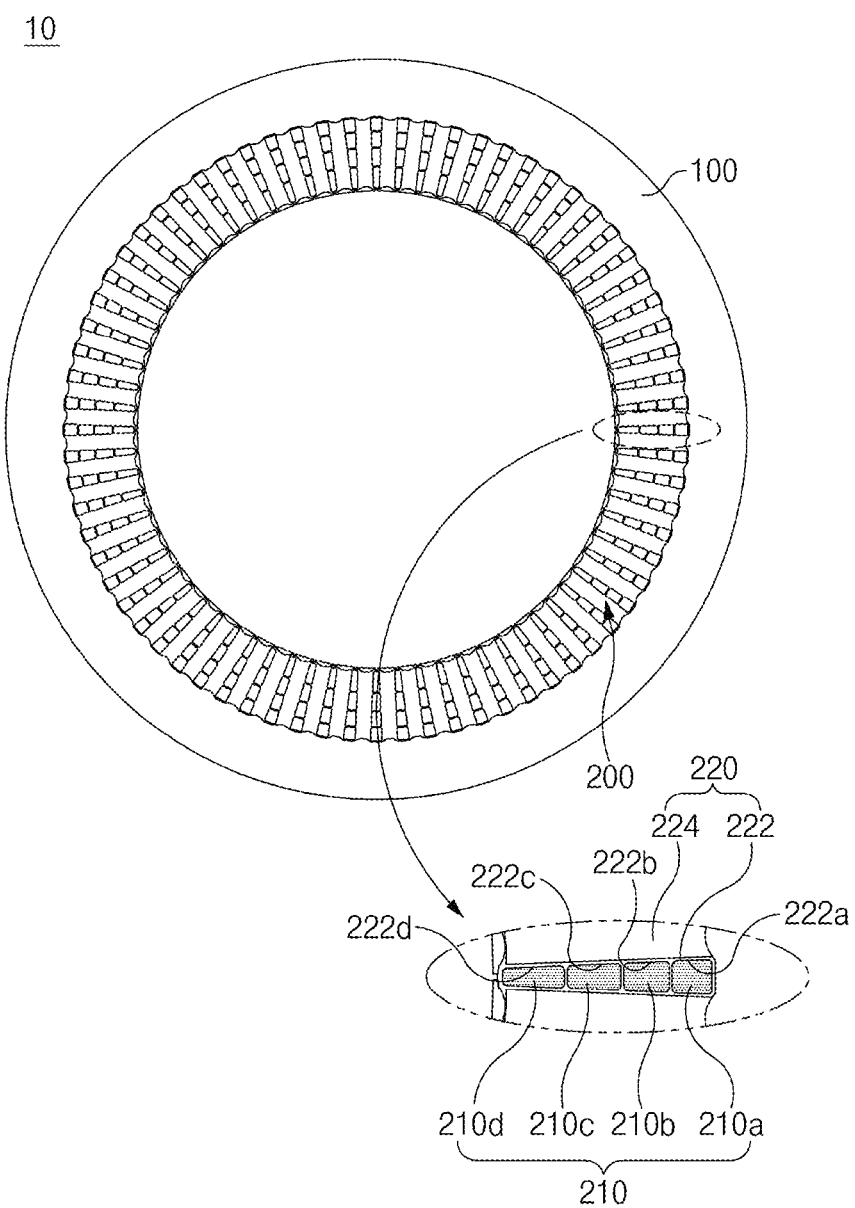
FIG. 2 is a top plan view for explaining the motor according to the embodiment of the present disclosure.
Figure 3:
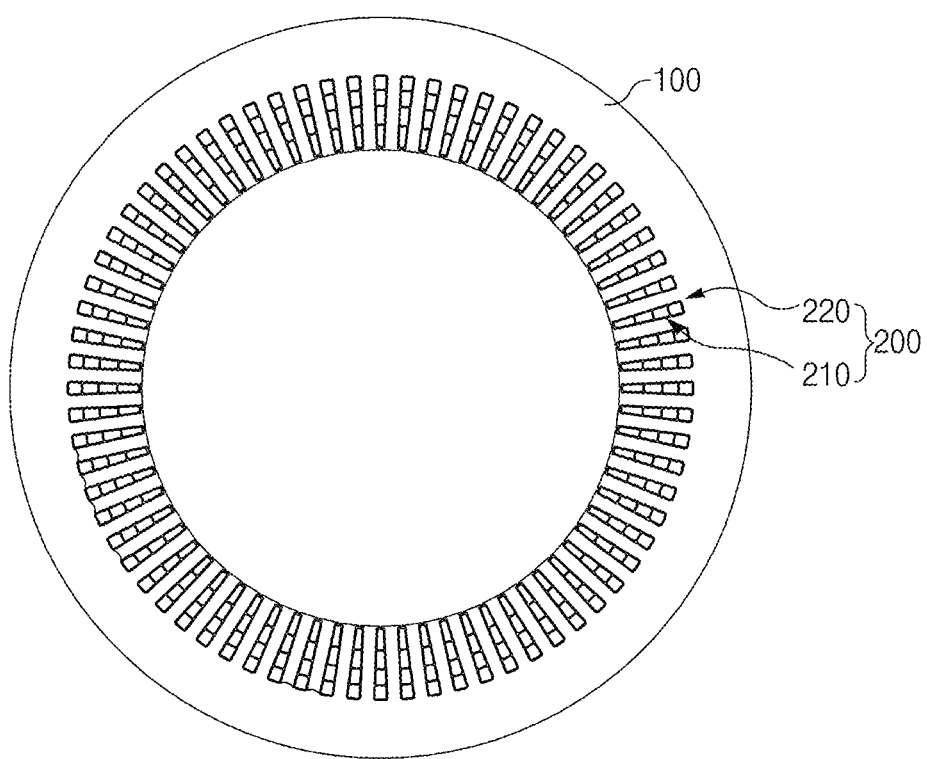
FIG. 3 is a bottom plan view for explaining the motor according to the embodiment of the present disclosure.
Figure 4:
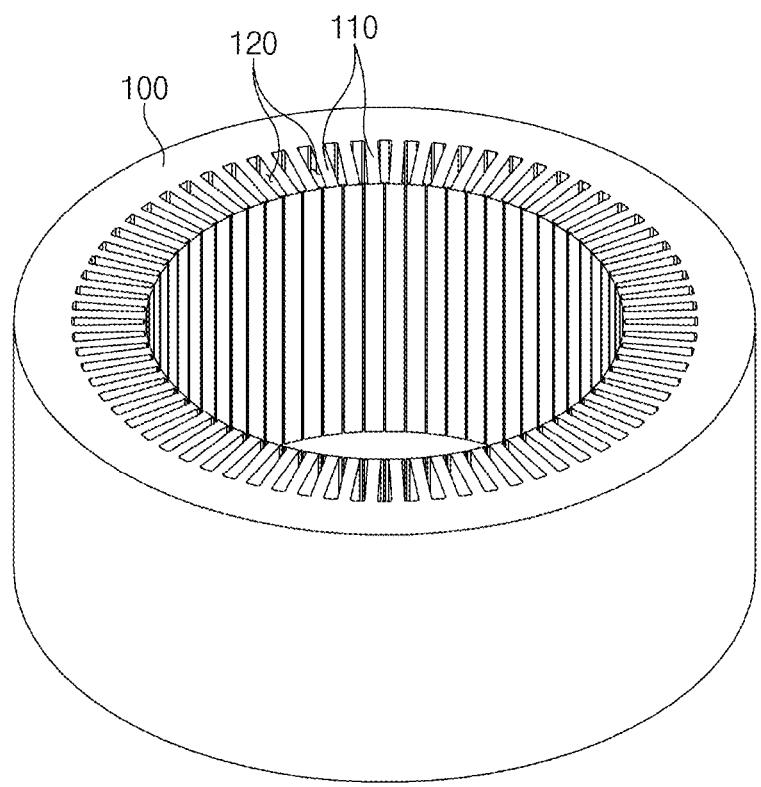
FIG. 4 is a view for explaining a core of the motor according to the embodiment of the present disclosure.

Referring to FIGS. 1 to 3, the stator may include a core 100 having a hollow cylindrical shape, and the coil assembly 200. The stator is disposed in the housing.

The core 100 may have various structures, each of which includes a plurality of teeth 110 disposed on an inner circumferential surface thereof and spaced apart from one another with slots 120 disposed between the teeth 110. The present disclosure is not restricted or limited by the structure and size (standard) of the core 100.

For example, the core 100 may be made by stacking a plurality of electric steel sheets in an axial direction of the stator. According to another embodiment of the present disclosure, the core may be made using a plurality of split cores that cooperatively defines a ring shape.

The slot 120 may be variously changed in number and structure in accordance with required conditions and design specifications. The present disclosure is not restricted or limited by the number of slots 120 and the structure of the slot 120.

In particular, referring to FIG. 3, the slot 120 has an approximately trapezoidal cross-sectional shape having a width that gradually decreases in a direction from the inside to the outside of the core 100 in a radial direction of the core 100 (in a direction toward an opening of the slot).

Figure 5:
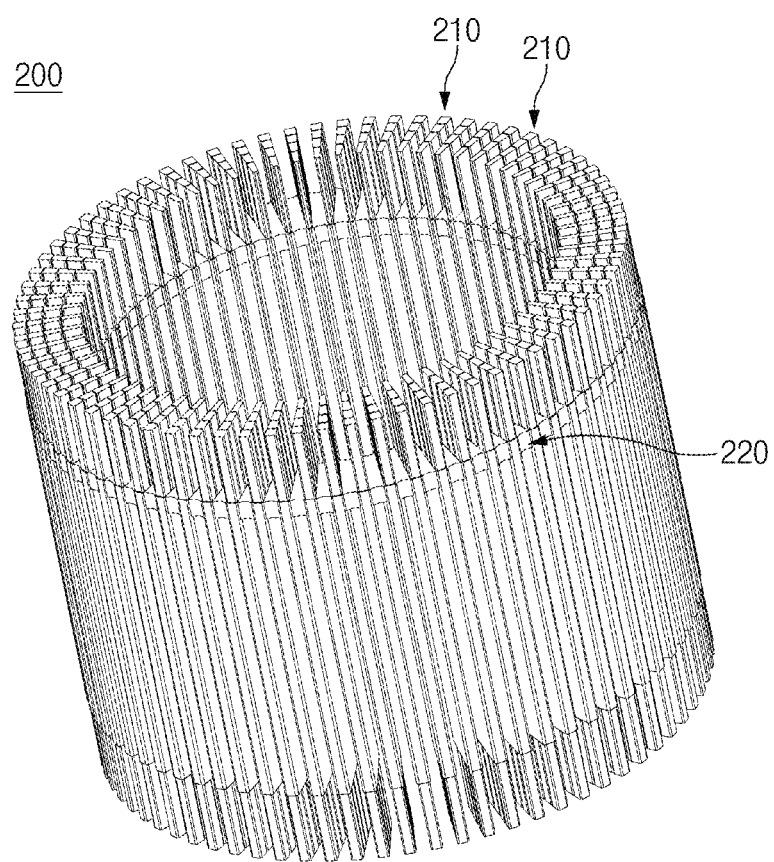
FIG. 5 is a perspective view for explaining a coil assembly according to the embodiment of the present disclosure.
Figure 6:
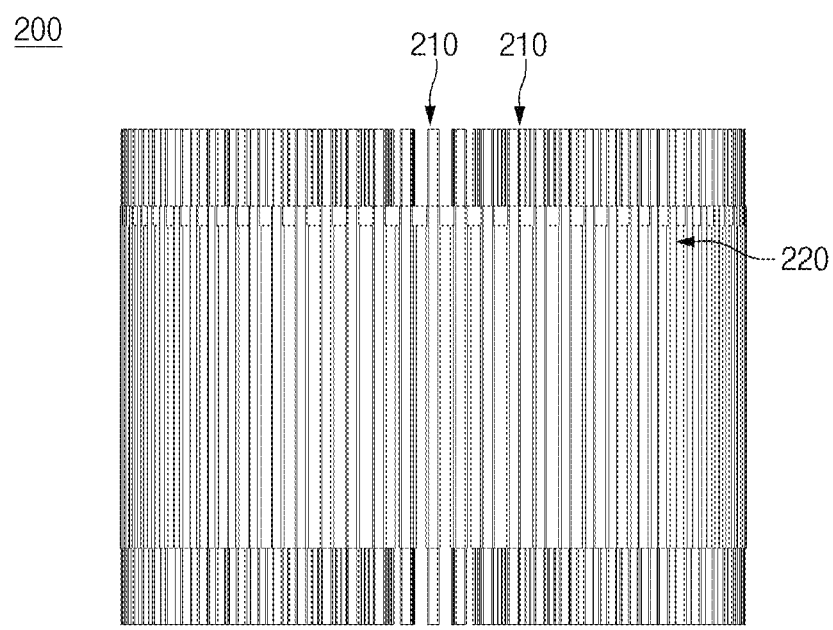
FIG. 6 is a side view for explaining the coil assembly according to the embodiment of the present disclosure.

Referring to FIGS. 5 and 6, the coil assembly 200 includes the plurality of unit flat coils 210 and the molding body 220.

For reference, the unit flat coil 210 in the embodiment of the present disclosure may be defined as a flat coil (or flat coil structure) that may be accommodated in the single slot 120. Further, the unit flat coils 210 may be disposed in a single layer or a plurality of layers in the radial direction of the core 100.

The unit flat coil 210 may have various structures capable of being accommodated in the slot 120, and the present disclosure is not restricted or limited by the structure of the unit flat coil 210.

In particular, the plurality of unit flat coils 210 may have the same structure. Therefore, the plurality of unit flat coils 210 may be manufactured using a single forming machine in common. Therefore, it is possible to obtain an advantageous effect of simplifying a manufacturing process and reducing manufacturing costs.

Figure 7:
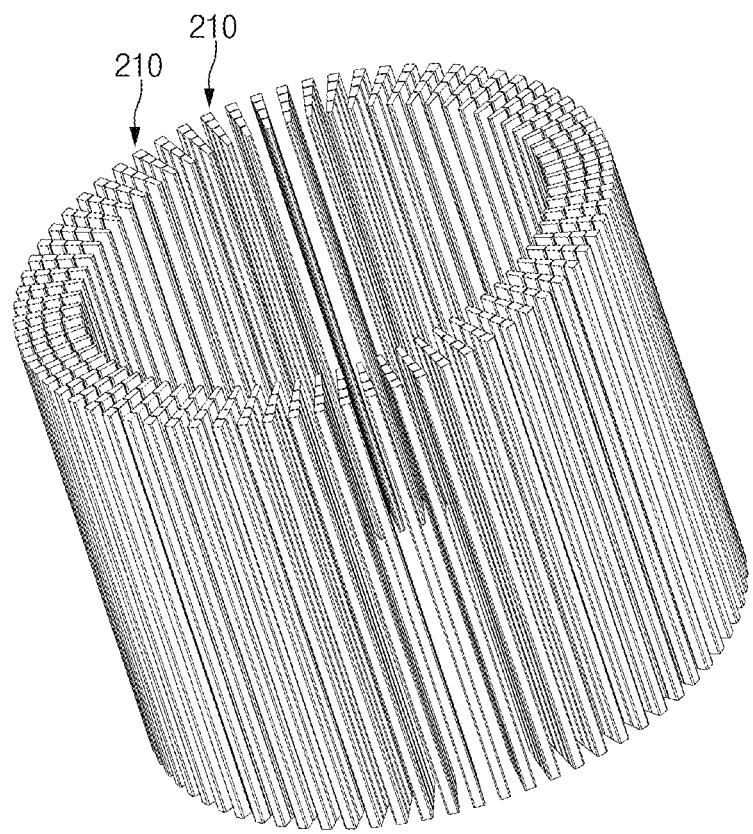
FIG. 7 is a view for explaining a structure in which unit flat coils are disposed in the coil assembly according to the embodiment of the present disclosure.
Figure 8:
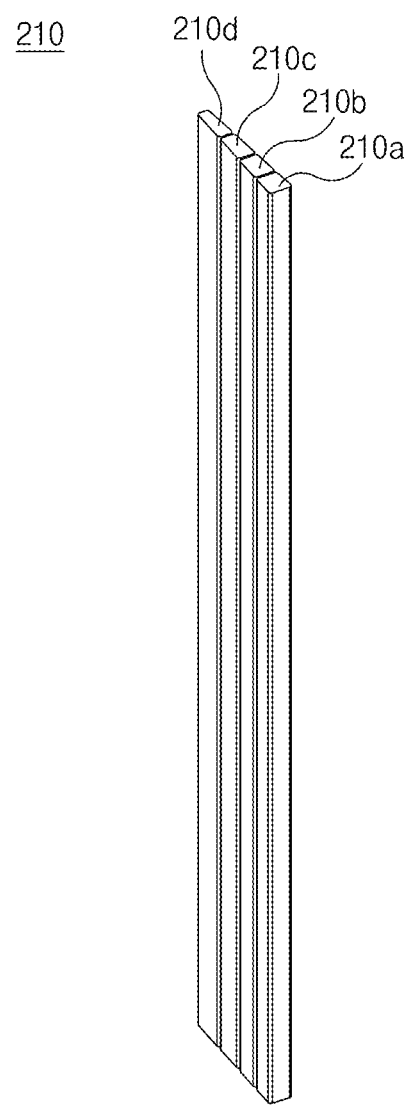
FIGS. 8 and 9 are views for explaining the unit flat coil of the coil assembly according to the embodiment of the present disclosure.
Figure 9:
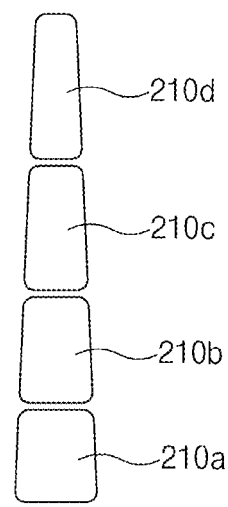

Referring to FIGS. 7 to 9, according to the exemplary embodiment of the present disclosure, the unit flat coil 210 may include a first flat coil 210a having a first cross-sectional shape, and a second flat coil 210b having a second cross-sectional shape different from the first cross-sectional shape and insulated from the first flat coil 210a by the molding body 220.

The flat coil, which constitutes the unit flat coil 210, may be variously changed in number and structure in accordance with required conditions and design specifications. The present disclosure is not restricted or limited by the number of flat coils and the structure of the flat coil.

Hereinafter, an example will be described in which the unit flat coil 210 includes the first flat coil 210a, the second flat coil 210b, a third flat coil 210c, and a fourth flat coil 210d. According to another embodiment of the present disclosure, the unit flat coil may include three or more flat coils or five or more flat coils.

For example, the third flat coil 210c may have a third cross-sectional shape different from the second cross-sectional shape, and the fourth flat coil 210*d* may have a fourth cross-sectional shape different from the third cross-sectional shape.

The first flat coil 210*a*, the second flat coil 210*b*, the third flat coil 210*c*, and the fourth flat coil 210*d* may each be made of a typical metallic material (e.g., copper) capable of forming a magnetic path and provided in the form of a rod having a predetermined length.

In particular, the first flat coil 210*a*, the second flat coil 210*b*, the third flat coil 210*c*, and the fourth flat coil 210*d* may each be configured by forming (e.g., pressing) a conductor (e.g., a spiral coil) excluding a coating film from a surface thereof.

In the embodiment of the present disclosure, since the unit flat coil 210 is configured by the conductor excluding a coating film from the surface thereof as described above, it is possible to freely form the flat coil without risk of damaging the coating film (because there is no coating film), exclude a process of removing the coating film, and allow a heat treatment (annealing) process to ensure extensibility of the flat coil.

More particularly, the first flat coil 210*a*, the second flat coil 210*b*, the third flat coil 210*c*, and the fourth flat coil 210*d* may have different trapezoidal cross-sectional shapes. The first flat coil 210*a*, the second flat coil 210*b*, the third flat coil 210*c*, and the fourth flat coil 210*d* may be disposed in four layers in the radial direction of the core 100 to cooperatively define a trapezoidal cross-sectional shape corresponding to the slot 120.

Since the unit flat coil 210 having the trapezoidal cross-sectional shape corresponding to the slot 120 is configured using the plurality of flat coils (the first flat coil, the second flat coil, the third flat coil, and the fourth flat coil) having different cross-sectional shapes as described above, it is possible to obtain an advantageous effect of forming a uniform magnetic path of the unit flat coil 210 and further improving the space factor.

The molding body 220 serves to support the plurality of unit flat coils 210 while insulating the plurality of unit flat coils 210. The molding body 220 is integrated with the unit flat coils 210 by dual injection molding and partially surrounds the unit flat coils 210.

For example, a typical insert process may be used as the method of forming the molding body 220. More specifically, the plurality of unit flat coils 210 may be manufactured in advance and then disposed (e.g., supported by a jig) in a mold (or a die) so as to be spaced apart from one another and arranged in a circular shape. Further, the molding body 220, which partially surrounds the unit flat coils 210 may be formed by injecting molten resin into the mold and then curing the resin.

The molding body 220 may be made of a typical insulating material (e.g., plastic resin) having insulation, and the present disclosure is not restricted or limited by the material and property of the molding body 220.

Since the molding body 220 is formed to partially surround the unit flat coils 210 as described above, a separate insulation sheet for insulating the unit flat coils 210 need not be inserted into the slot 120 of the core 100. Therefore, it is possible to obtain an advantageous effect of simplifying a manufacturing process and improving an assembly property.

The molding body 220 may be variously changed in structure in accordance with required conditions and design specifications, and the present disclosure is not restricted or limited by the structure of the molding body 220.

Figure 10:
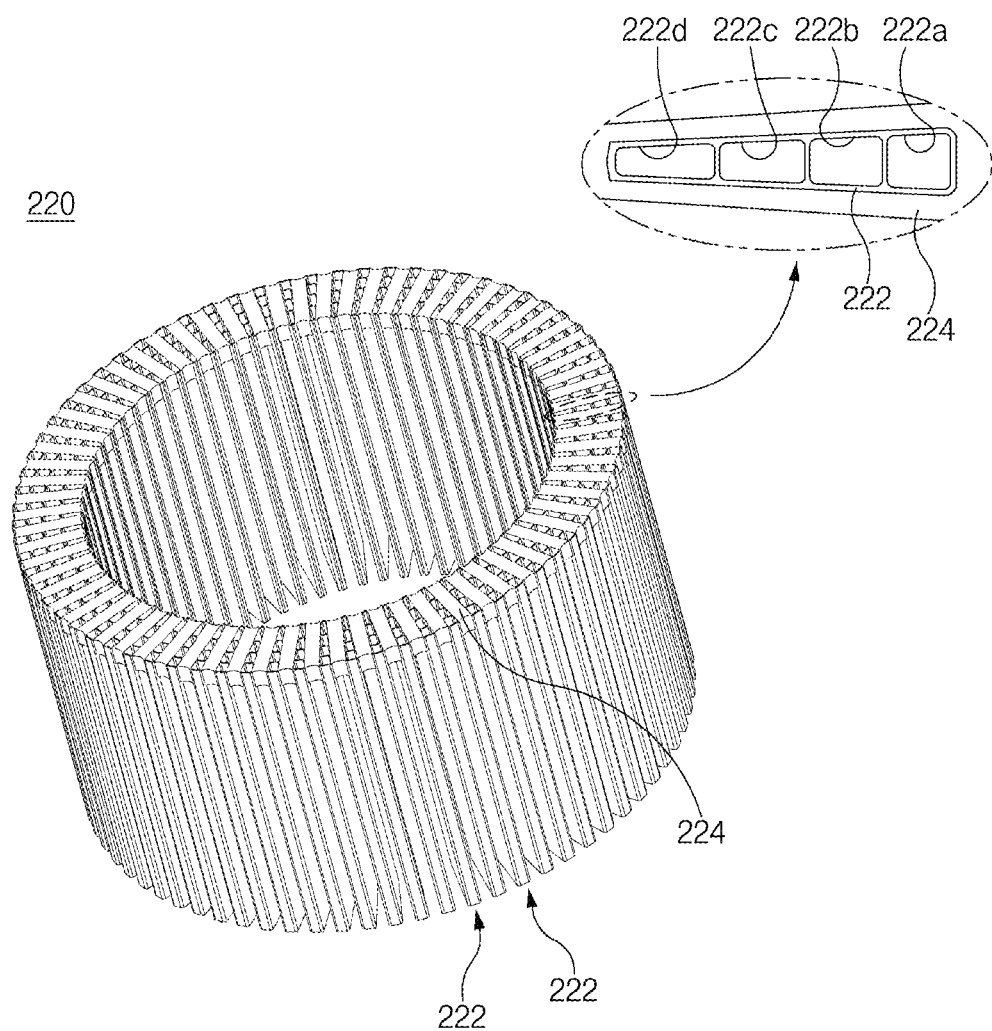
FIGS. 10 and 11 are views for explaining a molding body of the coil assembly according to the embodiment of the present disclosure.
Figure 11:
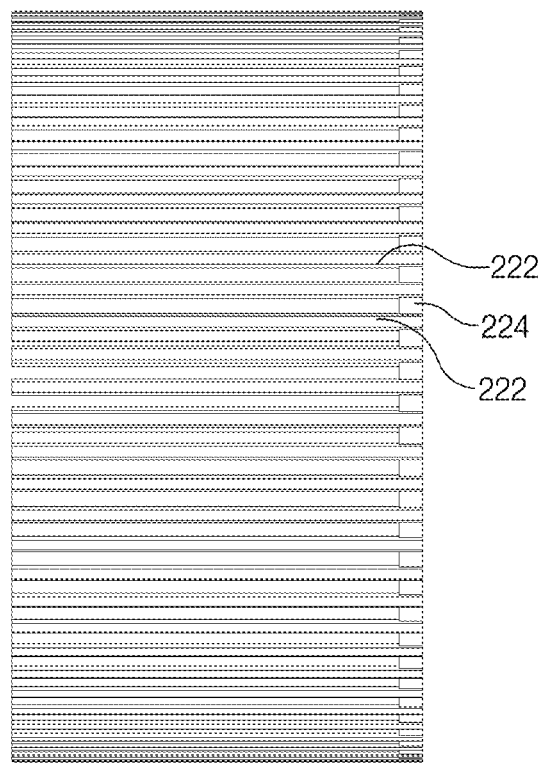

For example, referring to FIGS. 10 and 11, the molding body 220 may include: a plurality of unit molding portions 222 disposed for the respective unit flat coils 210 and configured to partially surround the unit flat coils 210; and a connection portion 224 configured to connect the adjacent unit molding portions 222.

In particular, the unit molding portion 222 may be configured to surround an approximately central portion of the unit flat coil 210. One end (an upper end based on FIG. 6) and the other end (a lower end based on FIG. 6) in a longitudinal direction of the unit flat coil 210 may be exposed to the outside of the molding body 220.

More specifically, the unit molding portion 222 may include: a first accommodation portion 222*a* configured to accommodate the first flat coil 210*a*; a second accommodation portion 222*b* spaced apart from the first accommodation portion 222*a* and configured to accommodate the second flat coil 210*b*, a third accommodation portion 222*c* spaced apart from the second accommodation portion 222*b* and configured to accommodate the third flat coil 210*c*, and a fourth accommodation portion spaced apart from the third accommodation portion 222*c* and configured to accommodate the fourth flat coil 210*d*. The first to fourth accommodation portions 222*a*, 222*b*, 222*c*, and 222*d* may have different trapezoidal cross-sectional shapes.

The connection portion 224 may have various structures capable of connecting the adjacent unit molding portions 222, and the present disclosure is not restricted or limited by the structure of the connection portion 224.

For example, the connection portion 224 may connect first ends of the adjacent unit molding portions 222, and second ends of the adjacent unit molding portions 222 may be disposed to be spaced apart from one another.

In particular, the connection portion 224 may be provided in the form of a ring to continuously connect the first ends (upper ends based on FIG. 10) of the adjacent unit molding portions 222.

Since the plurality of unit molding portions 222 is continuously connected by the connection portion 224 as described above, the plurality of unit flat coils 210 may be integrated with one another by the unit molding portions 222. Therefore, the plurality of unit flat coils 210 may be simultaneously inserted into the corresponding slots 120 without the inconvenience that may be caused at the time of individually inserting the plurality of unit flat coils 210 into the corresponding slots 120 one by one.

In addition, the connection portion 224 may be supported on outer surfaces (upper surfaces based on FIG. 1) of the teeth 110. Since the connection portion 224 is supported on the outer surfaces of the teeth 110 as described above, the connection portion 224 may inhibit (serve as a stopper for inhibiting) the unit flat coil 210 accommodated in the slot 120 from being withdrawn, through one end opening of the slot 120, toward the other end opening of the slot 120. Therefore, it is possible to obtain an advantageous effect of stably maintaining a state in which the coil assembly 200 is arranged with respect to the core 100.

Meanwhile, in the state in which the coil assembly 200 is disposed in the core 100, one end and the other end of the unit flat coil 210, which are exposed to the outside (upper and lower sides) of the core 100 may be twisted into a predetermined posture and then welded. The welded portion of the unit flat coil 210 may be coated with a coating material such as epoxy.

According to the embodiment of the present disclosure as described above, it is possible to obtain an advantageous effect of simplifying the structure of the coil assembly and the process of manufacturing the coil assembly.

In particular, according to the embodiment of the present disclosure, the flat coil and the molding body may be integrated by dual injection molding.

In addition, according to the embodiment of the present disclosure, it is possible to obtain an advantageous effect of simplifying the assembly process and improving the assembly property.

In addition, according to the embodiment of the present disclosure, it is possible to obtain an advantageous effect of freely forming the flat coil without risk of damaging a coating film, excluding a process of removing the coating film, and omitting a process of separately manufacturing an insulation sheet.

In addition, according to the embodiment of the present disclosure, it is possible to obtain an advantageous effect of allowing a heat treatment (annealing) process for ensuring extensibility of the flat coil.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A coil assembly comprising:
   a plurality of unit flat coils disposed and spaced apart from one another in a circumferential direction; and
   a molding body including a structure formed in dual injection molding and configured to partially surround the plurality of unit flat coils,
   wherein the molding body comprises:
   a plurality of unit molding portions disposed on the respective unit flat coils and configured to partially surround the unit flat coils, the plurality of unit molding portions including adjacent unit molding portions that are adjacent to each other in the circumferential direction, each of the adjacent unit molding portions including a plurality of accommodation portions aligned in a radial direction for accommodating the respective unit flat coils; and
   a connection portion disposed between the adjacent unit molding portions in the circumferential direction and configured to connect the adjacent unit molding portions of the plurality of unit molding portions to each other in the circumferential direction, and
   opposing sides of the connection portion are integrally formed with both of the adjacent unit molding portions, respectively, in the circumferential direction.

2. The coil assembly of claim 1, wherein each of the plurality of unit flat coils comprises:
   a first flat coil having a first cross-sectional shape; and
   a second flat coil having a second cross-sectional shape different from the first cross-sectional shape and insulated from the first flat coil by the molding body.

3. The coil assembly of claim 2, wherein each of the plurality of unit molding portions comprises:
   a first accommodation portion configured to accommodate the first flat coil; and
   a second accommodation portion spaced apart from the first accommodation portion and configured to accommodate the second flat coil.

4. The coil assembly of claim 1, wherein the connection portion connects first ends of the adjacent unit molding portions to each other, and second ends of the adjacent unit molding portions are disposed to be spaced apart from each other.

5. The coil assembly of claim 1, wherein each of the plurality of unit flat coils is configured by a conductor that is free of a coating film from a surface thereof.

6. The coil assembly of claim 1, wherein a first end and a second end in a longitudinal direction of each of the plurality of unit flat coils are exposed to an outside of the molding body.

7. The coil assembly of claim 1, wherein the plurality of unit flat coils have a same structure as each other.

8. A motor comprising:
   a core comprising a plurality of teeth disposed on an inner circumferential surface of the core and spaced apart from one another with slots disposed between the teeth; and
   a coil assembly comprising:
   a plurality of unit flat coils respectively accommodated in the slots; and
   a molding body including a structure formed in dual injection molding and configured to partially surround the plurality of unit flat coils,
   wherein the molding body comprises:
   a plurality of unit molding portions disposed on the respective unit flat coils and configured to partially surround the plurality of unit flat coils, the plurality of unit molding portions including adjacent unit molding portions that are adjacent to each other in the circumferential direction, each of the adjacent unit molding portions including a plurality of accommodation portions aligned in a radial direction for accommodating the respective unit flat coils; and
   a connection portion disposed between the adjacent unit molding portions in the circumferential direction and configured to connect the adjacent unit molding portions of the plurality of unit molding portions to each other in the circumferential direction, and
   opposing sides of the connection portion are integrally formed with both of the adjacent unit molding portions, respectively, in the circumferential direction.

9. The motor of claim 8, wherein each of the plurality of unit flat coils comprises:
   a first flat coil having a first cross-sectional shape; and
   a second flat coil having a second cross-sectional shape different from the first cross-sectional shape and insulated from the first flat coil by the molding body.

10. The motor of claim 9, wherein each of the plurality of unit molding portions comprises:
    a first accommodation portion configured to accommodate the first flat coil; and
    a second accommodation portion spaced apart from the first accommodation portion and configured to accommodate the second flat coil.

11. The motor of claim 8, wherein the connection portion connects ends of the adjacent unit molding portions to each other and is supported on the plurality of teeth.

12. The motor of claim 8, wherein each of the plurality of unit flat coils is configured by a conductor that is free of a coating film from a surface thereof.

13. The motor of claim 8, wherein a first end and a second end in a longitudinal direction of each of the plurality of unit flat coils are exposed to an outside of the molding body and the core.

* * * * *